United States Patent [19]

Onda et al.

[11] Patent Number: 4,665,473
[45] Date of Patent: May 12, 1987

[54] MULTIPLE OUTPUT SWITCHING POWER SUPPLY

[75] Inventors: Kenichi Onda; Kojin Abe, both of Hitachi, Japan

[73] Assignee: Hitachi, Ltd., Tokyo, Japan

[21] Appl. No.: 771,677

[22] Filed: Sep. 3, 1985

[30] Foreign Application Priority Data

Sep. 3, 1984 [JP] Japan ................. 59-184204

[51] Int. Cl.⁴ ........................................... H02M 3/335
[52] U.S. Cl. ................................. 363/21; 323/267
[58] Field of Search ................................. 363/18–21, 363/97, 131; 323/267

[56] References Cited

U.S. PATENT DOCUMENTS 4,504,896 3/1985 Easter et al. .................... 363/21

FOREIGN PATENT DOCUMENTS 55-120369 9/1980 Japan .
55-144775 11/1980 Japan .
56-19119 2/1981 Japan .

Primary Examiner—Peter S. Wong
Attorney, Agent, or Firm—Antonelli, Terry & Wands

[57] ABSTRACT

A compact multiple output switching power supply having a series connection of a D.C. input power supply, a switching device and a primary winding of a transformer which supplies currents to loads during an on period of the switching device, and supplies constant output voltages $V_i$ (i=1, 2, ..., m) from m (m≧2) secondary windings $n_i$ (i=1,2, ..., m) of the transformer by turning on and off the switching device, includes means for storing a magnetic energy during the on period of the switching device and discharging the stored energy to the loads during on off period, connected in series with the primary winding of the transformer. The output voltage $V_j$ (j=2, 3, ..., m) is represented by $$V_j = (n_j/n_1) \cdot (V_1 + k_1) - k_j$$

where $k_j$ is a voltage drop in the circuit.

6 Claims, 9 Drawing Figures

MULTIPLE OUTPUT SWITCHING POWER SUPPLY

BACKGROUND OF THE INVENTION

The present invention relates to a multiple output switching power supply, and more particularly to a current type multiple output switching power supply suitable to supply a power to an OA or FA equipment which requires a high precision of output voltage.

A current type switching power supply is disclosed in Japanese Unexamined Patent Publication No. 55-120369 which discloses that a recovery current of a flywheel diode inserted in a secondary circuit of a transformer does not flow into a switching device in a primary circuit of the transformer and flow of an excessive current in an input circuit is suppressed even if the transformer is saturated by a surge voltage from the input circuit. However, it does not recognize a problem encoutered in the multiple output switching power supply.

Japanese Unexamined Patent Publication No. 55-144775 discloses a technique to operate a switching device to stabilize one of the outputs so that the multiple outputs are stabilized. In the disclosed technique, a choke coil inserted in a secondary circuit of a transformer has a plurality of magnetically coupled windings. In the disclosed technique, it is not possible to determine the output voltages by turn ratios of a plurality of secondary windings wound on a transformer but turn ratios of the windings wound The choke coil should also be taken into consideration. As a result, the more the number of outputs is, the more difficult to design the power supply. Further, since one output is stabilized by the operation of the switching device, variations of other output voltages due to a variation of the one output voltage, that is, voltage variations due to so called cross-regulation increase. Causes of the cross-regulatin are leakage inductances and winding resistances of the transformer. In the disclosed technique, the leakage inductances and the winding resistances which cause the cross-regulation during an on period of the switching device affect to the transformer as well as leakage inductances and resistances of the windings of the choke coil and make if difficult to precisely control all of the output voltages.

In a technique disclosed in Japanese Unexamined Patent Publication No. 56-19119, an inductor is connected to an A.C. input. As a result , a ripple of a current flowing through the inductor is large, a current capacity of a rectifying/filtering circuit in a secondary circuit of a transformer is large and a maximum current flowing through a leakage inductor and a resistor of the transformer is large. As a result, outputs are affected by voltage drops thereacross and precision of the output voltages is lowered.

SUMMARY OF THE INVENTION

It is an object of the present invention to provide a multiple output switching power supply which is easy to design, suppresses variations of the output voltages due to a cross-regulation and can supply the multiple output voltages to loads with a high precision.

In the present invention, it was noticed that the prior art multiple output switching power supply having a plurality of windings in a choke coil inserted in a secondary circuit of a transformer increases the cross-regulation by a combination of leakage inductances and winding resistances of both the transformer and the choke coil, and the choke coil is inserted in a primary circuit of the transformer in order to suppress an influence by the choke coil. In the present arrangement, therefore, the leakage inductances and the winding resistances of the transformer and the choke coil which cause the cross-regulation are not combined and hence the precise output voltages are produced. Since the choke coil is inserted in the primary circuit of the transformer, the voltages developed across the windings of the transformer during an on period of the switching device are substantially equal to the respective output voltages, and the voltages induced across the windings of the choke coil during an off period of the switching device are also substantially equal to the respective output voltages. Accordingly, the respective output voltages are determined by the turn ratios of the secondary windings of the transformer and the choke coil and the design of the multiple output switching power supply is simplified.

DESCRIPTION OF THE PREFERRED EMBODIMENTS

One embodiment of the present invention is explained with reference to FIG. 1. E denotes a D.C. input power supply. A current $I_c$ flows, during an on period of a transistor Q which is a switching device, from a positive terminal of E through a reactor $T_2$ which stores a magnetic energy, a primary winding $n_p$ of a transformer $T_1$ to a negative terminal of E. Thus, voltages are developed across the primary winding $n_p$ and secondary windings $n_1$ and $n_2$ of the transformer $T_1$ with dotted ends being positive, and currents are supplied to loads from $n_1$ and $n_2$ through diodes $D_1$ and $D_2$, respectively. A capacitor $C_1$ smooths the voltage supplied to the load connected to an output terminal 1 and it is charged with a voltage $V_1$. A capacitor $C_2$ also functions in a similar manner to $C_1$ and it is charged with a voltage $V_2$ which is supplied to the load connected to an output terminal 2. Numeral 10 denotes means which discharges, during an off period of the transistor Q, the magnetic energy stored in the reactor $T_2$ during the on period of the transistor Q.

Figure 2:
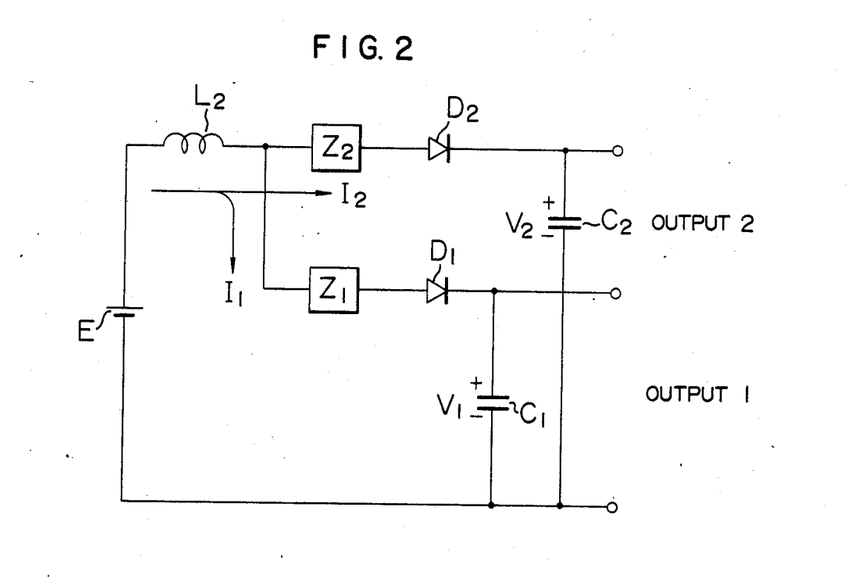
FIG. 2 is an equivalent circuit of the present invention during an on period of a transistor Q.

The operation of the present embodiment is explained with reference to FIG. 2 which shows an equivalent circuit during the on period of the transistor Q. $L_2$ denotes an inductance of the reactor $T_2$, $Z_1$ denotes an impedance including a leakage inductance, a winding resistance and a circuit resistance of the winding $n_1$, and $Z_2$ denotes an impedance including a leakage inductance, a winding resistance and a circuit resistance of the winding $n_2$. The current flowing through the inductance $L_2$ shunts to the output terminals 1 and 2 with currents $I_1$ and $I_2$, respectively. The currents $I_1$ and $I_2$ meet the following relationship.

$$I_1 \cdot A_1 + V_{D1} + V_1 = I_1 \cdot Z_2 + V_{D2} + V_2 \quad (1)$$

where $V_{D1}$ and $V_{D2}$ are voltage drops across the diodes $D_1$ and $D_2$, respectively. From the formula (1), the voltage $V_2$ at the output terminal 2 is expressed by $$V_2 = I_1 \cdot Z_1 + V_{D1} - (I_2 \cdot Z_2 + V_{D2}) + V \quad (2)$$

From the formula (2), it is seen that the voltage $V_2$ is represented by the voltage $V_1$ at the output terminal 1 and the circuit impedance.

Figure 1:
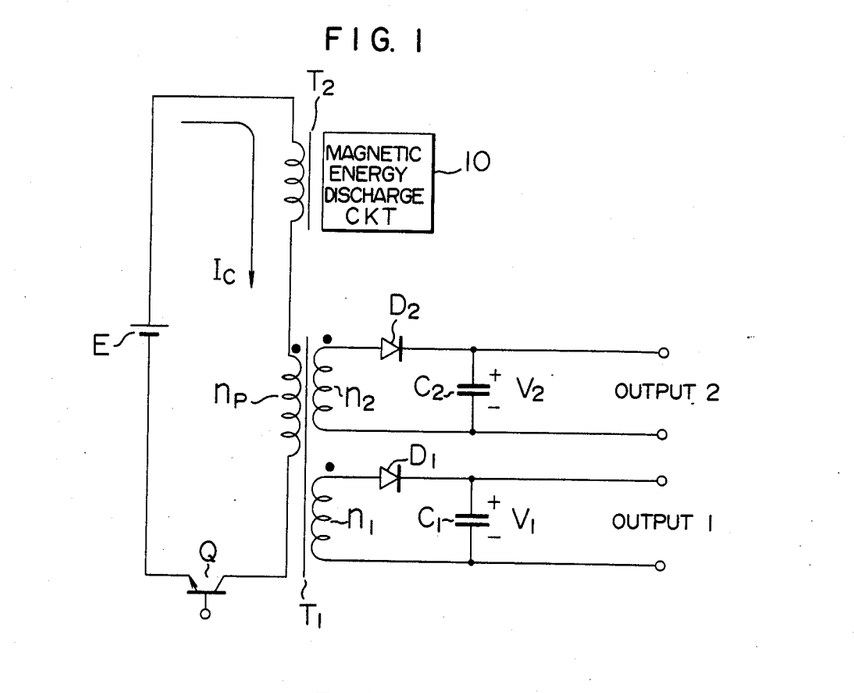
FIG. 1 shows one embodiment of the present invention.

Referring to FIG. 1, the voltages induced across the windings of the transformer $T_1$ during the on period of the tansistor Q is considered. The voltage induced across the winding $n_1$ with the dotted end being positive is equal to $V_1 + V_{D1}$, as seen from FIG. 1. Because of the voltage drop $I_1 \cdot Z_1$ due to the winding resistance and the circuit resistance of the tansformer, the voltage $V_p$ shown by the following formula must be developed across the primary winding $n_p$ of $T_1$ with the dotted end being positive.

$$V_p = \frac{n_2}{n_1}(I_1 \cdot Z_1 + V_{D1} + V_1) \quad (3)$$

If $V_p$ is given, a voltage $V_{n2}$ induced across the winding $n_2$ with the dotted end being positive is expressed by $$V_{n2} = V_p \cdot \frac{n_2}{n_p} - I_2 \cdot Z_2 \quad (4)$$

$$= \frac{n_2}{n_1}(I_1 \cdot Z_1 + V_{D1} + V_1) - I_2 \cdot Z_2$$

From the formula (4), the voltage $V_2$ at the output terminal 2 is expressed by $$V_2 = V_{n2} - V_{D2} \quad (5)$$

$$= \frac{n_2}{n_1}(I_1 \cdot Z_1 + V_{D1} - V_1) - (I_2 \cdot Z_2 + V_{D2})$$

The voltage drop $I_1 \cdot Z_1 + V_{D1}$ at the output terminal 1 is given by $k_1$ and the voltage drop $I_2 \cdot Z_2 + V_{D2}$ at the output terminal 2 is given by $k_2$. Thus, from the formula (5), the voltage $V_2$ is expressed by $$V_2 = \frac{n_2}{n_1}(V_1 + k_1) - k_2 \quad (6)$$

From the above, it is seen that the voltage $V_2$ at the output terminal 2 is defined by the turn ratio of the secondary windings $n_1$ and $n_2$ of the transformer $T_1$, and the function of the voltage $V_1$ at the output terminal 1 and the voltage drops in the circuit. Since $k_1$ and $k_2$ are generally smaller than $V_1$, $V_2$ can be expressed as follows without a large error.

$$V_2 \approx \frac{n_2}{n_1} \cdot V_1 \quad (7)$$

Thus, the turn ratios of the transformer $T_1$ can be substantially determined by the ratios of the output voltages and the circuit design is facilitated.

In the above embodiment, the multiple output switching power supply having two outputs was shown. When m outputs are included, the operations is similar and the output voltage $V_j$ ($j=2, \ldots, m$) is expressed by $$V_j = \frac{n_j}{n_1}(V_1 + k_1) - k_j \quad (8)$$

Accordingly, the design of the multiple output switching power supply is facilitated.

Figure 3:
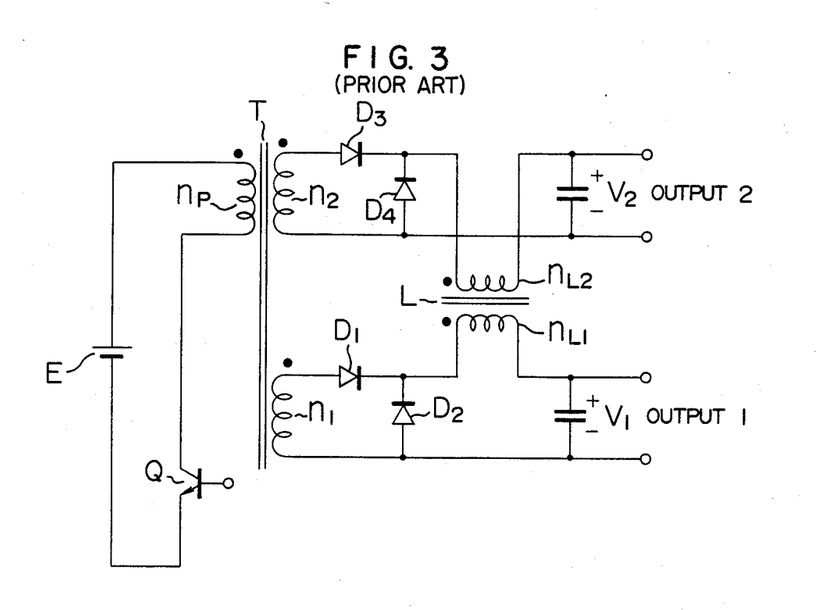
FIG. 3 shows a circuit configuration of a prior art multiple output switching power supply having a plurality of windings on a choke coil.

The embodiment of the present invention shown in FIG. 1 is compared with a prior art power supply having a plurality of magnetically coupled windings on a choke coil inserted in a secondary circuit of a transformer. FIG. 3 shows a configuration of the prior art power supply. T denotes a transformer, E denotes a D.C. input power supply, L denotes a choke coil having magnetically coupled windings $n_{L1}$ and $n_{L2}$, and $V_1$ and $V_2$ denote voltages at output terminals 1 and 2, respectively. Voltages are induced, during an on period of the transistor Q, across the windings of the transformer T and the choke coils L, with dotted ends being positive.

From FIG. 3, it is seen that the following relationships must be met during the on period of the transistor Q.

$$E \cdot \frac{n_1}{n_p} = V_{nL1} + V_1 \quad (9)$$

$$E \cdot \frac{n_2}{n_p} = V_{nL2} + V_2 \quad (10)$$

where $V_{nL1}$ and $V_{nL2}$ are voltages induced across the windings $n_{L1}$ and $n_{L2}$ of the choke coil L, respectively. In the formulas (9) and (10), the affects by the leakage inductances and winding resistances of the transformer T and the choke coil L, and diode voltage drops are omitted for the purpose of simplification.

The voltage $V_{nL2}$ of the formula (10) is expressed 1 as follows.

$$V_{nL2} = \frac{n_{L2}}{n_{L1}} \cdot V_{L1} \quad (11)$$

From the formulas (9), (10) and (11), $$\frac{V_{nL1}}{n_1} + \frac{V_1}{n_1} = \frac{1}{n_2} \cdot \frac{n_{L2}}{n_{L1}} \cdot V_{L1} + \frac{V_2}{n_2} \quad (12)$$

From the formula (12), the voltage $V_2$ at the output terminal 2 is expressed by $$V_2 = (V_{L1} + V_1) \cdot \frac{n_2}{n_1} - V_{L1} \cdot \frac{n_{L2}}{n_{L1}} \quad (13)$$

Since the impednaces of the transformer T and the choke coil and the diode voltage drops are omitted in the formula (13) as described above, the formula (13) corresponds to the formula (7) which represents the voltage $V_2$ in the embodiment of FIG. 1. As seen from the comparison of the formulas (7) and (13), the output voltage $V_2$ of the embodiment of FIG. 1 is essentially determined by the turn ratio of the secondary windings $n_1$ and $n_2$ of the transformer $T_1$ while the voltage $V_2$ in the prior art of FIG. 3 cannot be defined without taking the voltage $V_{L1}$ induced across the winding of the choke coil and the turn ratio of the choke coil L into consideration, and hence proper design of the power supply is difficult to attain.

Figure 4:
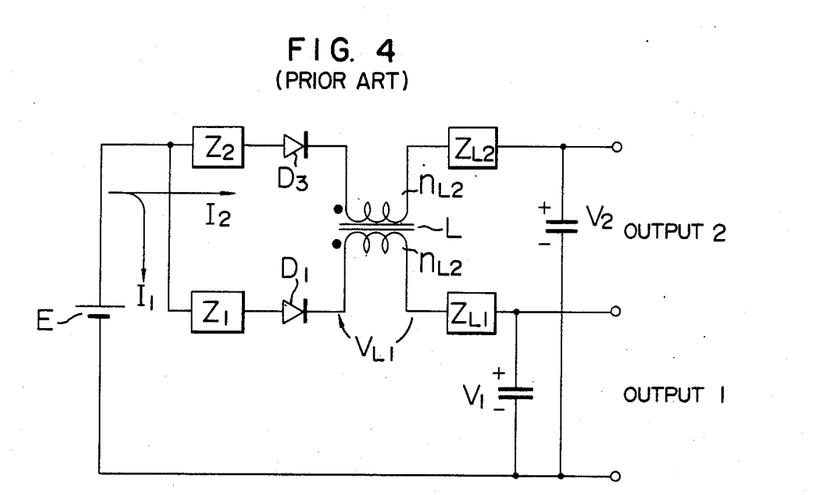
FIG. 4 is an equivalent circuit of FIG. 3.

Referring to an equivalent circuit shown in FIG. 4, the operation of the prior art power supply of FIG. 3 is explained in detail. FIG. 4 shows the equivalent circuit during the on period of the transistor Q. E denotes the D.C. input power supply, $I_1$ and $I_2$ denote the currents supplied to loads connected to output terminals 1 and 2, respectively, $Z_1$ and $Z_2$ denote the impedances including the leakage inductances, winding resistances and circuit resistances of the transformer T, and $Z_{L1}$ and $Z_{L2}$ denote the impedances including the leakage inductances, winding resistances and winding resistances of the windings $N_{L1}$ and $n_{L2}$ of the choke coil L. As seen from FIG. 4, the currents $I_1$ and $I_2$ flowing through the output terminals 1 and 2 meet the following relationship.

$$I_1 \cdot (Z_1 + Z_{L1}) + V_{D1} + V_{L1} + V_1 = \quad (14)$$

$$I_2 \cdot (Z_2 + Z_{L2}) + V_{D3} + \frac{n_{L2}}{n_{L1}} \cdot V_{L1} - V_2 = E$$

From the formula (14), the voltage $V_2$ at the output terminal 2 is expressed by $$V_2 = I_1 \cdot (Z_1 + Z_{L1}) - I_2 \cdot (Z_2 + Z_{L2}) + \quad (15)$$

$$\left(1 - \frac{n_{L2}}{n_{L1}}\right) \cdot V_{L1} + V_{D1} - V_{D3} + V_1$$

From the formula (15), it is seen that when the output currents $I_1$ and $I_2$ change, voltage variations which are proportional to $(Z_1+A_{L1})$ and $(Z_2+Z_{L2})$, respectively, take place in $V_2$.

On the other hand, in the present embodiment, it is seen from the formula (2) that the variation of $V_2$ when $I_1$ and $I_2$ change is proportional to $Z_1$ and $Z_2$. As a result, the voltage variation due to the change of the load current is smaller in the embodiment of FIG. 1 and the precision of the output is higher.

As described above, the embodiment of FIG. 1 and the prior art of FIG. 3 are differenct from each other in their concepts and effects.

Figure 5:
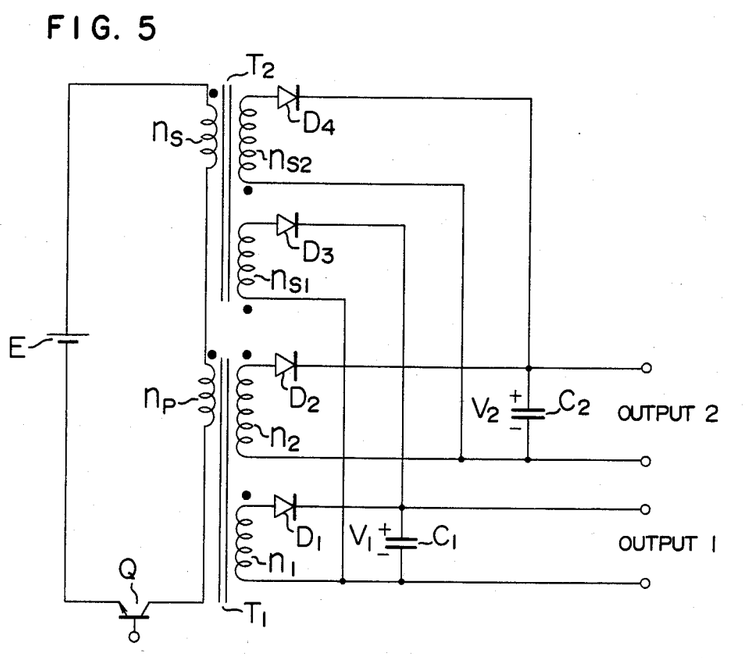
FIG. 5 shows energy discharge means of FIG. 1.

FIG. 5 shows a circuit configuration of the energy discharge means 10 shown in FIG. 1. The energy discharge means 10 comprises windings $n_{s1}$ and $n_{s2}$ magnetically coupled to the primary winding $n_s$ of the reactor $T_2$ and diodes $D_3$ and $D_4$ connected to ends of the windings $n_{s1}$ and $n_{s2}$, respectively. The winding $n_{s1}$ is connected through the diode $D_3$ in parallel to the secondary winding $n_1$ of the transformer $T_1$ and the winding $n_{s2}$ is connected through the diode $D_4$ in parallel to the winding $n_2$. During the on period of the transistor Q, voltages are induced across the windings of $T_2$ with the dotted ends being positive. Accordingly, the volatages induced across the windings $n_{s1}$ and $n_{s2}$ during the on period of the transistor Q are blocked by the diodes $D_3$ and $D_4$ and no current flows. The current flowing through the winding $n_s$ is an exciting current of $T_2$ and a magnetic energy is stored by the exciting current. When the transistor Q is turned off, the current flowing through the winding $n_s$ is cut off and voltages are developed across the windings of $T_2$ with the opposite ends to the dotted ends being positive, by the magnetic energy stored in $T_2$. As a result, currents flow out of the windings $n_{s1}$ and $n_{s2}$ into the loads connected to the output terminals 1 and 2, respectively.

Figure 6:
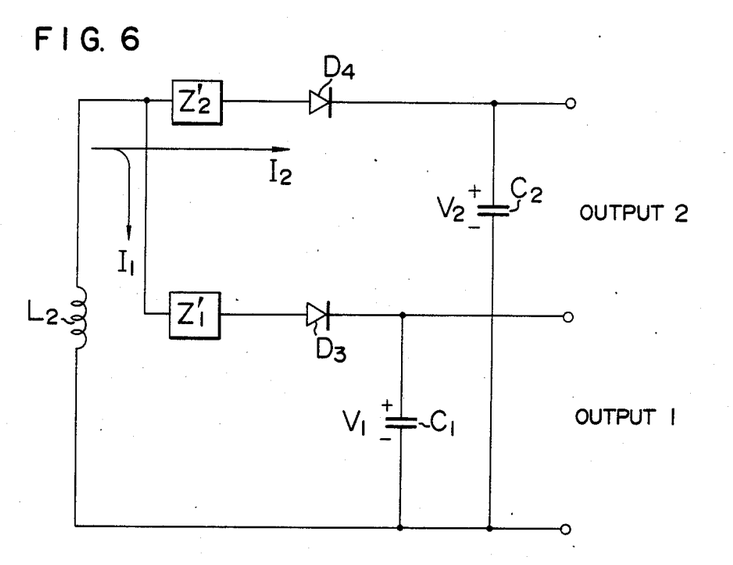
FIG. 6 is an equivalent circuit during an off period of the transistor Q, for illustrating an operation of the energy discharge circuit.

The operation of the energy discharge means is explained in detail with reference to an equivalent circuit of FIG. 6 during the off period of the transistor Q. $L_2$ denote an inductance of the reactor $T_2$, and $Z_1'$ and $Z_2'$ denote impedances including the leakage inductances, winding resistances and circuit resistances of the windings $n_{s1}$ and $n_{s2}$, respectively. As seen from the equivalent circuit, the voltage $V_2$ at the output terminal 2 is expressed by $$V_2 = I_1 \cdot Z_1' + V_{D3} - (I_2 \cdot Z_2' + V_{D4}) + V_1 \quad (16)$$

The voltages induced across the windings of $T_2$ during the off period of the tansistor Q is expressed by the formula (4) as seen from FIG. 5, and the voltage $V_{ns2}$ across the winding $n_{s2}$ is expressed by $$V_{ns2} = \frac{n_{s2}}{n_{s1}} \cdot (I_1 \cdot Z_1' + V_{D3} + V_1) - I_2 \cdot Z_2' \quad (17)$$

From the equation (17), the voltage $V_2$ at the output terminal 2 is expressed by $$V_2 = V_{ns2} - V_{D4} \quad (18)$$

$$= \frac{n_{s2}}{n_{s1}} \cdot (I_1 \cdot Z_1' + V_{D3} + V_1) - (I_2 \cdot Z_2' + V_{D4})$$

In the formulas (16)–(18), $V_{D3}$ and $V_{D4}$ are voltage drops across the respective diodes $D_3$ and $D_4$.

The voltage drop $I_1 \cdot Z_2' + V_{D3}$ at the output terminal 1 is expressed by $k_1$, and the voltage drop $I_2 \cdot Z_2' + V_{D4}$ at the output terminal 2 is expressed by $k_2$. Thus, from the formula (18), $V_2$ is expressed by $$V_2 = \frac{n_{s2}}{n_{s1}} (V_1 + k_1) - k_2 \quad (19)$$

It is seen from the above that the voltage $V_2$ at the output terminal 2 during the off period of the transistor Q is defined by a function similar to that shown in the formula (6).

The same is applicable to the multiple output switching power supply having m outputs. The output voltage $V_j$ (j=2, 3, ..., m) is expressed by $$V_j = \frac{n_j}{n_1} \cdot (V_1 + k_1) - k_j \quad (20)$$

Accordingly, the output voltage $V_j$ is essentially defined by the turn ratio of the secondary windings $n_1$ and $n_j$ of the reactor $T_2$ as is done for the tansformer $T_1$ and the design of the power supply is facilitated. Further, in the present embodiment, since the magnetic energy stored in the reactor $T_2$ is supplied to the loads by the energy discharge means 10, the efficiency of the multiple output switching power supply is improved.

Figure 7:
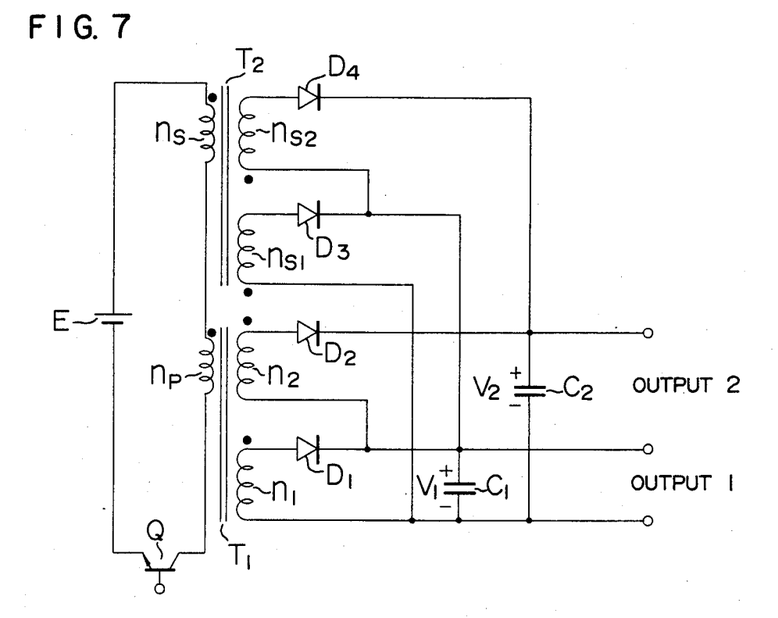
FIG. 7 to 9 show other embodiments of the present inventon.

FIG. 7 shows another embodiment. In the present embodiment, a voltage $V_1$ at an output terminal 2 is a sum of a voltage $V_1$ developed across a winding $n_1$ and a voltage developed across a winding $n_2$. Windings $n_{s1}$ and $n_{s2}$ are similarly configured to develop a voltage $V_2$ at an output terminal 2.

In the embodiment of FIG. 1, the turn ratio of the windings $n_1$ and $n_2$ is essentially same as the ratio of the output voltages $V_1$ and $V_2$, as shown in the formula (7). The same is true for the turn ratio of the windings $n_{s1}$ and $n_{s2}$. On the other hand, it is seen from the formulas (5) and (8) that the smaller the ratios $n_2/n_1$ and $n_{s2}/n_{s1}$ are, more the variation of the voltage $V_2$ due to the change of the output current $I_1$ is suppressed. Thus, in the present embodiment, the numbers of turns of the windings $n_2$ and $n_{s2}$ are reduced to suppress the variation of the voltage $V_2$ and improve the output precision.

In the circuit configuration of FIG. 7, the numbers of turns of the windings $n_2$ and $n_{s2}$ are selected such that the voltage $V_2$ at the output terminal 2 is a sum of the voltage $V_1$ at the output terminal 1 and the voltages developed across the windings $n_2$ and $n_{s2}$. Thus, the turn ratios of the windings $n_2$ and $n_{s2}$ are selected as follows.

$$\frac{n_2}{n_1} \approx \frac{V_2 - V_1}{V_1} \quad (21)$$

$$\frac{n_{s2}}{n_{s1}} \approx \frac{V_2 - V_1}{V_1} \quad (22)$$

Accordingly, the turn ratios $n_2/n_1$ and $n_{s2}/n_{s1}$ are smaller than those of the embodiment of FIG. 1, and hence the variation of the voltage $V_2$ at the output terminal 2 is suppressed and the precision of the output is improved.

Figure 8:
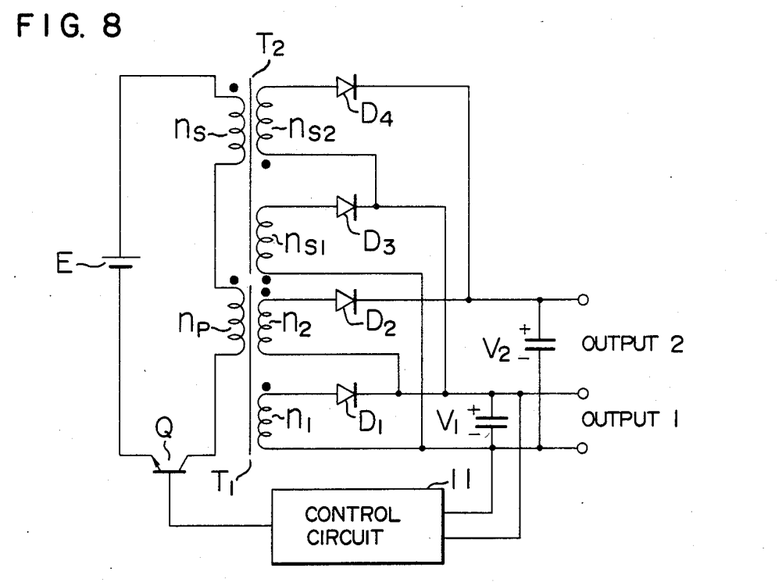

FIG. 8 shows another embodiment. In the present embodiment, a control circuit 11 is provided to control the switching of the transistor Q to keep the voltage $V_1$ at the output terminal 1 constant. It is seen from the formulas (6) and (19) that if the voltage $V_1$ at the output terminal 1 is constant, the voltage at the output terminal 2 can be stabilized within a variation of a voltage drop across an impedance in the circuit.

In the present embodiment, since the voltage $V_1$ at the output terminal 1 is kept constant, the voltage $V_2$ at the output terminal 2 need not take the change of $V_1$ into consideration as shown in the formulas (6) and (19), and the output precision of the voltage $V_2$ is further improved. Alternatively, the control circuit 11 of the present embodiment may be provided in the embodiment of FIG. 1 to control the switching of the transistor Q in order to keep the voltage $V_1$ of the output terminal 1 constant.

Figure 9:
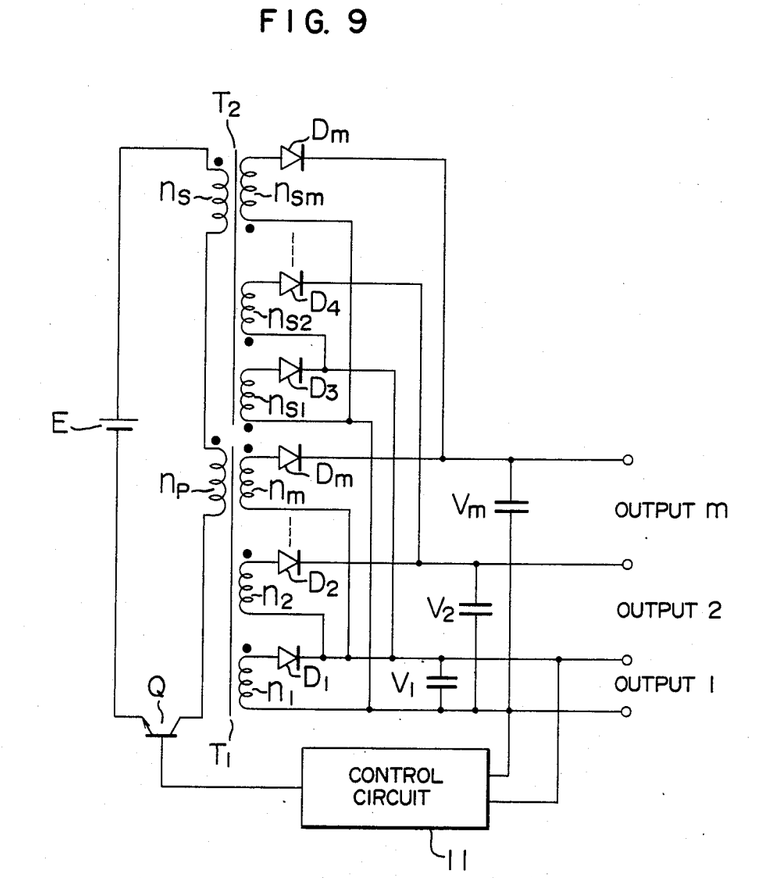

FIG. 9 shows another embodiment. In the present embodiment, m outputs are supplied to the loads in the embodiment of FIG. 8. By controlling the switching of the transistor Q by the control circuit 11 to keep the voltage $V_1$ at the output terminal 1 constant, m stable voltages can be supplied to the loads.

Alternatively, the control circuit 11 may be provided in the embodiment of FIG. 1 to control the switching of the transistor Q in order to keep the voltage $V_1$ at the output terminal 1 constant, so that stable outputs are supplied from m secondary windings wound on the transformer $T_1$ and the reactor $T_2$.

The control circuit 11 shown in FIGS. 8 and 9 may be Hitachi switching power supply control IC HA17524 or Texas Instruments TL 494. The configuration and operation of those IC's are well known and they are not explained here.

In accordance with the present invention, the output voltages of the multiple output switching power supply can be defined by the turn ratios of the secondary windings of the transformer and the windings of the energy discharge circuit of the reactor, and the design of the power supply is facilitated. When the control circuit is used to control the switching device such that one of the output voltages is kept constant, the voltage variations of other outputs can be less than ±5%. Thus, the multiple output switching power supply used for the QA and FA equipments are simplified and the size and cost thereof can be reduced.

We claim:

1. A multiple output switching power comprising:
   a series connection of a D.C. input power supply, a switching device and a primary winding of a first transformer for supplying currents to loads during an on period of said switching device, so that m constant output voltages $V_i (i=1, 2, \ldots, m, m \geq 2)$ are supplied to said loads from m secondary windings $w_i$ of said first transformer by on-off switching of said switching device; and
   means connected in series with the primary winding of said first transformer for storing a magnetic energy during the on period of said switching device and discharging the stored energy to the loads during an off period, wherein in order to produce a predetemined output voltage $V_j$, the number of turns $n_j (j=2, 3, \ldots, m)$ of a j-th secondary winding $w_j$ is determined by a first formula, $$V_j = (N_j/N_1) \cdot (V_1 + k_1) - k_j$$

where $V_1$ is an output voltage of a first secondary winding $w_1$, $n_1$ is the number of turns of said first secondary winding $w_1$, $n_j/n_1$ is a turns ratio of said j-th secondary winding $w_j$ to said first secondary winding $w_1$, $k_1$ is a voltage drop in a circuit of said first secondary winding $w_1$, and $k_j$ is a voltage drop in a circuit of said j-th secondary winding $w_j$.

2. A multiple output switching power supply according to claim 1, wherein said means for storing and discharging includes a second transformer having a primary winding thereof connected in series with said primary winding of said first transformer and having m secondary windings $w_{si} (i=1, 2, \ldots, m)$, said secondary winding $w_i$ and said secondary winding $w_{si}$ being connected in parallel to each other through a diode, and a capacitor being connected thereacross to supply voltages to the loads, wherein in order to produce said predetermined output voltage $V_j$, the number $n_{nsj}$ of turns $(j=2, 3, \ldots, m)$ of a j-th secondary winding $w_{si}$ of said second transformer is determined by a second formula, $$V_j = (N_{sj}/N_{s1}) \cdot (V_1 + k_{si}) - k_{sj}$$

where $n_{s1}$ is the number of turns of a first secondary winding $w_{s1}$, $n_{sj}/n_{s1}$ is a turns ratio of said j-th secondary winding $w_{sj}$ to said first secondary winding $w_{s1}$, $k_{s1}$ is a voltage drop in a circuit of said first secondary winding $w_{si}$ and $k_j$ is a voltage drop in a circuit of said secondary winding $w_{sj}$.

3. A multiple output switching power supply according to claim 2, wherein said predetermined output voltage $V_j$ is a sum of the voltage represented by said second formula and $V_1$.

4. A multiple output switching power supply according to claim 3, wherein said switching device is controlled to keep the output voltage $V_1$ constant.

5. A multiple output switching power supply according to claim 1, wherein said predetermined output voltage $V_j$ is a sum of the voltage represented by said first formula and $V_1$.

6. A multiple output switching power supply according to claim 5, wherein said switching device is controlled to keep the output voltage $V_1$ constant.

* * * * *